United States Patent
Kimoto

(10) Patent No.: US 7,505,185 B2
(45) Date of Patent: Mar. 17, 2009

(54) COLOR IMAGE COMMUNICATION DEVICE AND COLOR IMAGE COMMUNICATION METHOD

(75) Inventor: Osamu Kimoto, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 1231 days.

(21) Appl. No.: 10/658,013

(22) Filed: Sep. 9, 2003

(65) Prior Publication Data

US 2004/0075875 A1    Apr. 22, 2004

(30) Foreign Application Priority Data

Oct. 17, 2002    (JP)    ............................. 2002-302521
Jul. 9, 2003     (JP)    ............................. 2003-194093

(51) Int. Cl.
*H04N 1/00*    (2006.01)
*H04N 1/46*    (2006.01)
*H04N 1/54*    (2006.01)
*H04N 1/56*    (2006.01)
*H04N 1/64*    (2006.01)

(52) U.S. Cl. ......................... 358/500; 358/1.2; 358/1.6; 358/1.15; 358/1.16; 358/501; 358/505; 358/523; 358/524; 358/528; 358/400; 358/434; 358/435; 358/436; 358/438; 358/439; 358/449; 358/451; 358/468; 358/474

(58) Field of Classification Search .................. 358/1.2, 358/1.6, 1.15, 1.16, 500, 501, 505, 523, 524, 358/528, 400, 434, 435, 436, 438, 439, 449, 358/451, 468, 474

See application file for complete search history.

(56) References Cited

U.S. PATENT DOCUMENTS

| | | | |
|---|---|---|---|
| 5,361,143 A | | 11/1994 | Nakayama et al. |
| 5,455,687 A | | 10/1995 | Fukui et al. |
| 5,696,598 A | | 12/1997 | Yoshida et al. |
| 5,801,846 A | * | 9/1998 | Nobuta ........................ 358/468 |
| 5,956,162 A | * | 9/1999 | Nobuta ........................ 358/500 |
| 6,259,469 B1 | * | 7/2001 | Ejima et al. .............. 348/14.01 |
| 6,288,800 B1 | * | 9/2001 | Izumi .......................... 358/468 |
| 6,791,710 B1 | * | 9/2004 | Bannai ........................ 358/1.2 |
| 6,970,262 B1 | * | 11/2005 | Saito .......................... 358/1.15 |

(Continued)

FOREIGN PATENT DOCUMENTS

JP    09-069953    3/1997

(Continued)

OTHER PUBLICATIONS

Chinese language Office Action and its English translation for corresponding Chinese Application No. 2003101013693 lists the references above.

*Primary Examiner*—Twyler L Haskins
*Assistant Examiner*—Beniyam Menberu
(74) *Attorney, Agent, or Firm*—Hogan & Hartson LLP

(57) ABSTRACT

A color image communication device includes a transmission unit which carries out a facsimile transmission of image data of a sYCC-Joint Photographic Experts Group (JPEG) color space, and a control unit which controls a facsimile transmission of the image data of the sYCC-JPEG color space without setting size information in a facsimile communication protocol when the image data to be transmitted by facsimile is the image data of the sYCC-JPEG color space.

19 Claims, 3 Drawing Sheets

U.S. PATENT DOCUMENTS

| | | | |
|---|---|---|---|
| 7,092,113 B1 * | 8/2006 | Saito et al. | 358/1.15 |
| 7,110,026 B2 * | 9/2006 | Feldis, III | 348/231.6 |
| 7,277,197 B2 * | 10/2007 | Yoshida | 358/1.9 |
| 7,289,245 B2 * | 10/2007 | Kagawa | 358/1.9 |
| 7,400,428 B2 * | 7/2008 | Yoshida | 358/426.07 |
| 2002/0039201 A1 * | 4/2002 | Yoshida | 358/449 |
| 2002/0089702 A1 * | 7/2002 | Yoshitani et al. | 358/448 |
| 2003/0142329 A1 | 7/2003 | Yoshida | |
| 2004/0075850 A1 * | 4/2004 | Yoshida | 358/1.2 |
| 2004/0114196 A1 * | 6/2004 | Yoshida | 358/426.07 |

FOREIGN PATENT DOCUMENTS

| | | |
|---|---|---|
| JP | 2000-059597 | 2/2000 |
| JP | 2000-332933 | 11/2000 |
| JP | 2001-078041 | 3/2001 |
| JP | 2001-078041 A | 3/2001 |
| JP | 1 119 179 | 7/2001 |
| JP | 2001-285647 | 10/2001 |
| JP | 2002-204361 | 7/2002 |
| JP | 2003-101799 | 4/2003 |
| JP | 2003-158622 * | 5/2003 |
| JP | 2003-298829 | 10/2003 |

* cited by examiner

COLOR IMAGE COMMUNICATION DEVICE AND COLOR IMAGE COMMUNICATION METHOD

BACKGROUND OF THE INVENTION

1. Field of the Invention

The present invention relates to a color image communication device and a color image communication method to be used in a facsimile machine, a copy machine, a multifunction peripheral of these machines or the like.

2. Description of the Related Art

A color facsimile machine includes a color scanner, and transmits scanned color image data via a telephone line. The color facsimile machine of this type transmits image data according to the International Telecommunication Union-Telecommunications (ITU-T) Recommendation T.81. However, there is a limit as to the size of the color image data which can be transmitted. Therefore, there are problems that image data photographed by a digital camera cannot be transmitted by facsimile. This is due to the fact that the size of the data file of the digital camera or the like is designated purely by the number of pixels (number of dots for length X width), and not by the number of pixels calculated from a printing size and the resolution which is handled in a conventional facsimile machine.

The image data photographed by a digital camera is generally expressed as Joint Photographic Experts Group (JPEG) image data of a standard (s) YCC color space (hereinafter referred to as the "sYCC-JPEG image data"). Meanwhile, the ITU-T Recommendation T.81 defines to transmit color image data as JPEG image data of a LAB color space of Computer-Integrated Enterprises (CIE) color system (hereinafter referred to as the "CIELAB-JPEG image data").

Accordingly, a proposed device obtains function information (resolution, output color number) from a printer such that high quality color image data photographed by a digital camera in particular can be forwarded to the printer via a telephone line. When the obtained resolution or output color number of the printer is less than that of the device, the proposed device generates transmission image data in accordance with a lower resolution or output color number.

However, according to this technology, since transmission image data is generated in accordance with the function information of the printer, a construction for generating the data becomes complicated, and expensive. Moreover, when the resolution or the output color number of the proposed printer is less than that of the device, the proposed device generates the transmission image data in accordance with a lower resolution or output color number. It is not assumed to transmit the image data photographed by a digital camera without lowering the resolution or the output color number.

Next, a proposed facsimile machine is provided with a slot for a recording media used in a digital camera or the like. The proposed facsimile machine fetches once to a memory from the recording media, YCC-JPEG image data obtained by photographing by a digital camera. Then, the proposed facsimile machine deploys the YCC-JPEG image data as Red, Green, and Blue (RGB) image data in the memory of the proposed facsimile machine, and adds white pixels such that a width of the image data increases to a prescribed number of pixels. The proposed facsimile machine compresses the image data into LAB-JPEG image data again, and transmits the LAB-JPEG image data sequentially in accordance with the ITU-T Recommendation T.81.

According to this technology, the image data of a digital camera or the like is not transmitted from a facsimile machine as it is. In other words, the recording media (for example, Smart Media) is inserted in the slot of the proposed facsimile machine for loading the YCC-JPEG image data. The YCC-JPEG image data is converted into the RGB image data, and the white pixels are added. Then, the image data is compressed into LAB-JPEG image data, and transmitted. Therefore, there are problems that the proposed facsimile machine becomes complex and expensive.

Another proposed device includes a function for transmitting color information by a binary file transfer mode when communicating color information handled by a personal computer and color information handled by a digital camera. In addition, the proposed device includes a function for executing a facsimile communication in accordance with the ITU-T Recommendation T.81 when communicating color information handled by a personal computer and color information handled by a digital camera. When a recipient does not have a receiving function of a binary file transfer mode, the color information is converted into facsimile information based on the ITU-T Recommendation T.81, and the facsimile information is transmitted. When the recipient has the receiving function of the binary file transfer mode, the color information is transmitted by a binary file transfer mode.

According to this technology, when the recipient does not have the receiving function of the binary file transfer mode, the color information is converted into the facsimile information based on the ITU-T Recommendation T.81, and transmitted. Therefore, the image data of a digital camera or the like is not transmitted as it is. As a result, there are problems that a construction for converting the image becomes complicated and expensive.

SUMMARY OF THE INVENTION

The present invention was made in consideration to the above-described problems. It is an advantage of the present invention to provide a color image communication device and a color image communication method which can transmit and receive easily and under low cost, color image data photographed by a digital camera or the like, without converting or compressing the color image data.

To accomplish the advantage of the present invention, a color image communication device includes a transmission unit and a control unit. The transmission unit carries out a facsimile transmission of image data of a sYCC-JPEG color space. When color image data to be transmitted by facsimile is image data of the sYCC-JPEG color space, the control unit controls to carry out a facsimile transmission of the image data of the sYCC-JPEG color space without setting size information in a Digital Command Signal (DCS) of a facsimile communication protocol.

According to this device, color image data of the sYCC-JPEG color space photographed by a digital camera or the like can be used for the facsimile communication without converting or compressing as in a conventional technology. As a result, the construction becomes simple, and the image data of the sYCC-JPEG color space can be communicated easily, under low cost.

Moreover, the color image communication device of the present invention also includes a transmission unit which transmits color image data of a first color space (CIELAB-JPEG) in accordance with a facsimile communication protocol, and another transmission unit which transmits color image data of a second color space (sYCC-JPEG) in accordance with another facsimile communication protocol. The color image communication device also includes a control unit which controls a facsimile transmission of color image data. In case of the color image data of the first color space, the control unit controls to carry out a facsimile transmission of the color image data after setting size information in the DCS of the facsimile communication protocol. Moreover, in the case of the color image data of the second color space, the control unit controls to carry out a facsimile transmission of the color image data without setting size information in the DCS of the facsimile communication protocol.

The color image communication method of the present invention includes a step of carrying out a facsimile transmission. According to this step, when color image data to be transmitted by facsimile is image data of a sYCC-JPEG color space, the image data of the sYCC-JPEG color space is transmitted by facsimile without setting size information in a DCS of a facsimile communication protocol.

The color image communication method of the present invention also includes another step of carrying out a facsimile transmission. According to this step, when color image data to be transmitted by facsimile is image data of a sYCC-JPEG color space, the image data of the sYCC-JPEG color space is transmitted by facsimile without setting size information in the DCS of a facsimile communication protocol. When color image data to be transmitted is not image data of a sYCC-JPEG color space, size information is set in a facsimile communication protocol, and the image data of the color space other than the sYCC-JPEG color space is transmitted by facsimile.

Moreover, a color image communication device of the present invention includes a reception unit and a control unit. The reception unit receives an image data file of a sYCC-JPEG color space in accordance with a facsimile communication protocol. When the received color image data is image data of a sYCC-JPEG color space, the control unit does not determine size information at the reception in accordance with a DCS of a facsimile communication protocol. In this case, the control unit processes the image data file of the sYCC-JPEG color space in accordance with function information attached to the received image data file. In other words, when the received color image data is image data of a sYCC-JPEG color space, the control unit analyzes the function information attached to the image data file with priority rather than the size information set in the DCS. When receiving the image data of the sYCC-JPEG color space by facsimile, the control unit stores the image data to a memory under a format as received.

DETAILED DESCRIPTION OF THE PREFERRED EMBODIMENTS

Embodiments of the present invention will be described in details.

Figure 1:
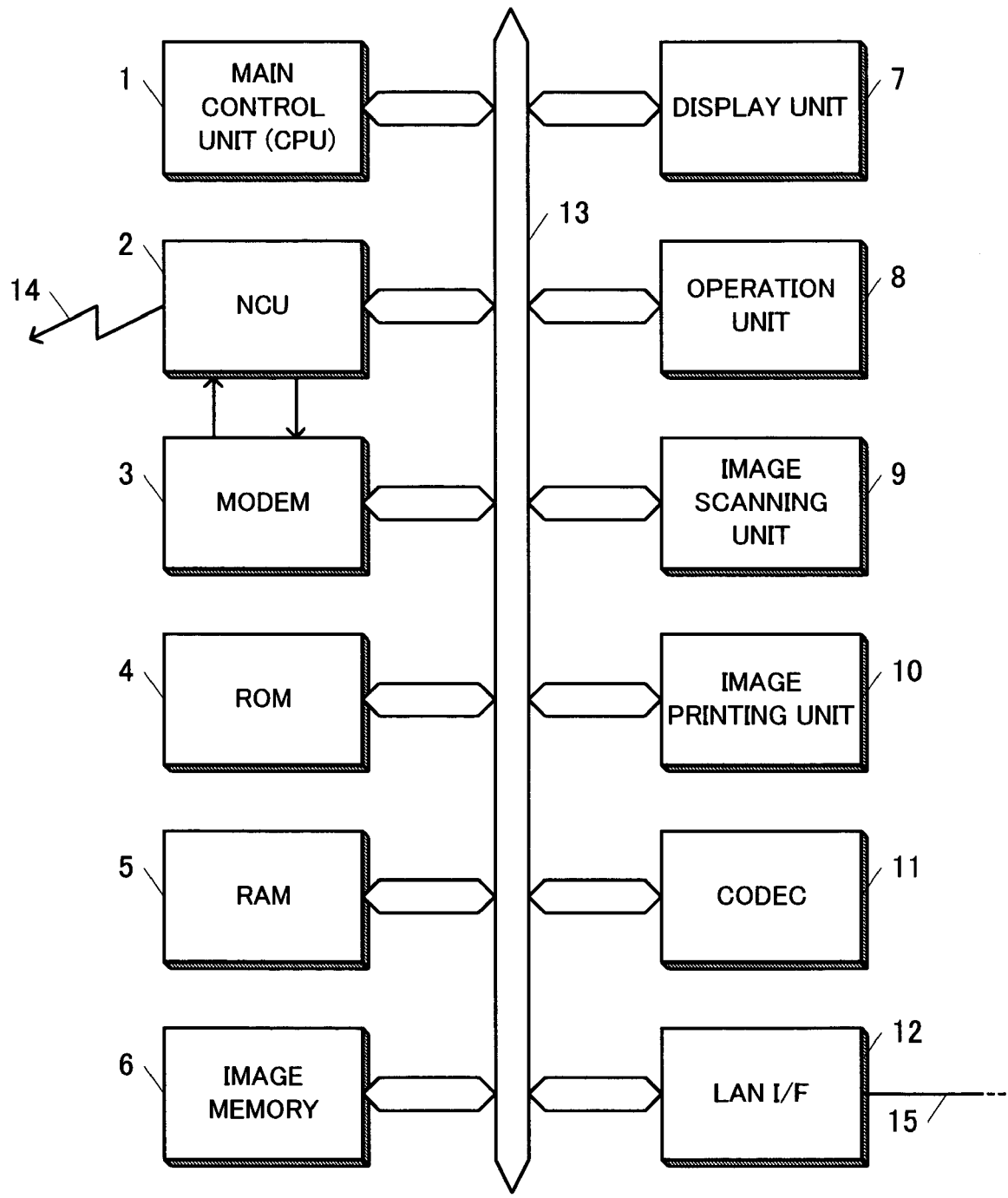
FIG. 1 is a block diagram showing an example of a color image communication device according to an embodiment of the present invention.

FIG. 1 is a block diagram showing an example of a construction of a color image communication device according to an embodiment of the present invention. The color image communication device is formed as a multifunction peripheral which functions as both a copy machine and a facsimile machine. The facsimile machine includes a function for carrying out a facsimile communication of color image data in accordance with a facsimile communication protocol defined by the ITU-T Recommendation.

In FIG. 1, a Central Processing Unit (CPU) 1 as a main control unit includes a function for carrying out an overall control of each of the parts of the color image communication device.

A Network Control Unit (NCU) 2, a modem 3, a Read Only Memory (ROM) 4, a Random Access Memory (RAM) 5, an image memory 6, a display unit 7, an operation unit 8, an image scanning unit 9, an image printing unit 10, a Coder and Decoder (CODEC) 11, and a Local Area Network Interface (LAN I/F) 12 are connected to the CPU 1 via a bus 13.

The NCU 2 is controlled by the CPU 1, and controls a connection established with a Public Switched Telephone Network (PSTN) 14 that is a communication line. Moreover, the NCU 2 includes a function for transmitting a dial pulse according to a telephone number (including a facsimile number) of a destination, and a function for detecting an incoming call. The modem 3 modulates transmission data and demodulates received data in accordance with V.17, V.27ter, V.29, etc. based on a facsimile transmission control protocol (facsimile communication protocol) following the ITU-T Recommendation T.30, T.4. Moreover, the modem 3 can be applied to V.34 FAX using V.8, V.34. Specifically, the modem 3 includes a function for modulating transmission data, which is a digital signal, into an analoge voice signal to transmit to the PSTN 14 via the NCU 2. The modem 3 also includes a function for demodulating the analoge voice signal received from the PSTN 14 via the NCU 2 into a digital signal.

The ROM 4 stores programs or the like for controlling an operation of the entire color image communication device. The RAM 5 stores data such as data that is necessary for the control by the CPU 1, and data that is necessary to be temporarily stored at the control operation. The image memory 6 stores image data scanned by the image scanning unit 9 under a compressed state, and also stores image data received from a remote device via the PSTN 14 and the modem 3 under a compressed state. Furthermore, the image memory 6 stores image data received from a remote device such as a personal computer via a local area network (LAN), or image data loaded from a recording media under a compressed state (JPEG, etc.).

The display unit 7 displays icons and key buttons, contents of messages necessary for a transmission and a reception of data, and a telephone number or a facsimile number entered by operating the operation unit 8. A Cathode Ray Tube (CRT) display or a Liquid Crystal Display (LCD) is used as the display unit 7. The operation unit 8 includes a ten-key numeric pad, one-touch keys, an enter key, a start key, and an operation mode switching key. The ten-key numeric pad is used for entering telephone numbers and facsimile numbers. The one-touch keys are used for calling up a telephone number or a facsimile number of a destination by one-touch. The enter key is used for registering a speed dial number for the telephone number or the facsimile number of the destination. The start key is used for instructing to start a facsimile communication or a copy operation. The operation mode switching key is used for switching modes among a plurality of operation modes such as a facsimile mode, a copy mode, or a scanner mode.

The image scanning unit 9 optically scans and reads an image of an original document when carrying out a facsimile transmission or a copy operation. The image scanning unit 9 can also scan a color image. When scanning a color image, the image scanning unit 9 optically scans an image of an original document, and obtains a color separation signal of three colors, Red, Green, and Blue (RGB). The image printing unit 10 is formed from an electro-photographic typed printer. The image printing unit 10 prints out onto a recording paper, the received image data or image data of an original document scanned by the image scanning unit 9 in the copy operation. The image printing unit 10 uses toner of four colors, Cyan, Magenta, Yellow, and black (CMYK). The image printing unit 10 can carry out a monochrome printing using toner of only the black component (K), and also a color printing using toner of all four colors, CMYK.

The CODEC 11 encodes the scanned image data by a Modified Huffman (MH), a Modified Read (MR), a Modified Modified Read (MMR) method or the like for transmitting or storing the scanned image data. Moreover, the CODEC 11 decodes image data received under an encoded state for printing out the image data by the image printing unit 10. Furthermore, the CODEC 11 encodes by the JPEG method, the color image data obtained by a color scanning operation of the image scanning unit 9. The CODEC 11 decodes the received color image data, which is in a state encoded by the JPEG method, for printing out the color image data by the image printing unit 10. The LAN I/F 12 exchanges data with a remote device via a LAN 15. A remote device such as a personal computer (PC) is connected to the color image communication device via the LAN I/F 12. For example, image data of a sYCC-JPEG color space can be received from a remote device via the LAN I/F 12. The received image data of the sYCC-JPEG color space is stored in the image memory 6 under the encoded state.

Figure 2:
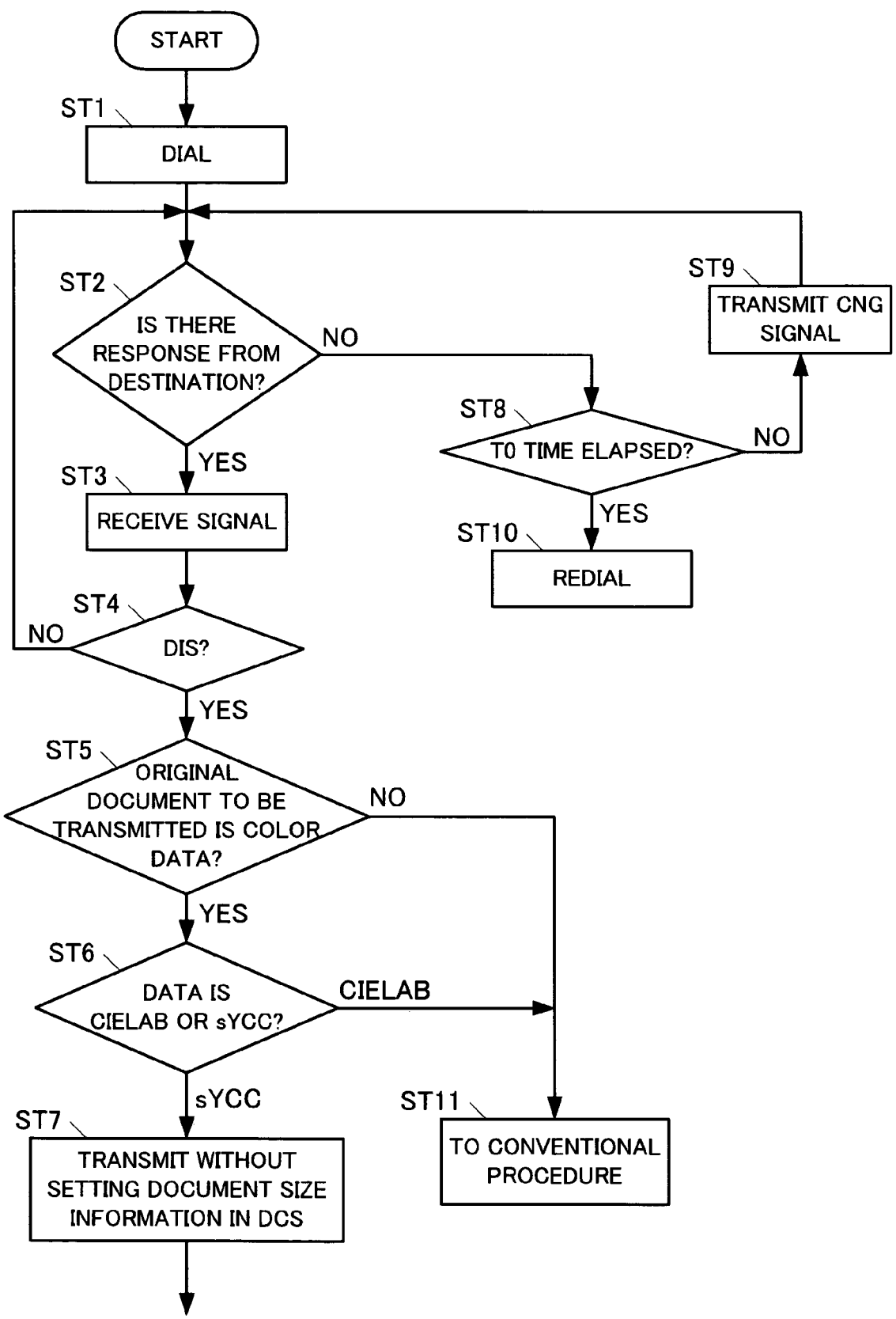
FIG. 2 is a flowchart showing a transmission operation of when carrying out a facsimile transmission of color image data.

Next, a transmission operation of when carrying out a facsimile transmission of color image data by the color image communication device will be described with reference to the flowchart shown in FIG. 2. First, in step ST1, a facsimile number of a destination (called end) is dialed. Then, in step ST2, it is determined whether or not there is a response from the destination. When there is no response, in step ST8, it is determined whether or not a preset time (T0) has elapsed. When the time T0 elapses, in step ST10, a redial processing is executed. In other words, the process returns to step ST1. When the time T0 has not elapsed, in step ST9, a Calling Tone (CNG) signal is transmitted, and the process returns to step ST2.

When there is a response from the destination in step ST2, a signal is received from the destination in step ST3. Then, in step ST4, it is determined whether or not the received signal is a Digital Identification Signal (DIS) in the facsimile transmission control protocol. When the received signal is not a DIS signal, the process returns to step ST2.

When it is determined in step ST4 that a DIS signal is received, prior to an actual transmission of the image data, in step ST5, it is determined whether or not an original document (image) to be transmitted is color image data. For example, when transmitting the image data scanned by the image scanning unit 9, it is determined in step ST5 whether the scanned image data is color image data or monochrome image data according to whether the image data has been scanned by a color mode or by a monochrome mode. Moreover, when transmitting image data (file) stored in the image memory 6 prior to the start of the facsimile transmission operation, the determination of whether the image data to be transmitted is color image data or monochrome image data can be carried out in accordance with a file name of the image data or function information attached to the file. When it is determined that the image data is color image data, in step ST6, it is determined whether the color image data is image data of a CIELAB-JPEG color space, or image data of a sYCC-JPEG color space. In the case of sYCC-JPEG image data, in step ST7, the sYCC-JPEG image data is transmitted by facsimile under a compressed state, without setting document size information (for example, main scanning width, sub scanning line density, resolution) in a Digital Command Signal (DCS) of the facsimile transmission control protocol. In step ST7, information indicating the fact that the image data is sYCC-JPEG image data is set in the DCS signal, and a file of the sYCC-JPEG image data is transmitted under a state in which the function information is attached in the file. For example, the function information includes information indicating a number of pixels (number of dots for length X width), or information indicating a fact that the image data is image photographed by a digital camera.

Meanwhile, when it is determined in step ST5 that the original document is not color image data, in other words, when it is determined that the original document is monochrome image data, the process proceeds to step ST11. Moreover, when it is determined in step ST6 that the color image data is CIELAB-JPEG image data, the process proceeds to step ST11. In step ST11, a facsimile transmission is carried out as usual under a format according to the ITU-T Recommendation T.81 or the like. In the facsimile transmission processing of step ST11, document size information is set in the DCS signal, and monochrome image data or CIELAB-JPEG image data is transmitted by facsimile. When transmitting monochrome image data, information indicating the fact that the image data is monochrome image data is set in the DCS signal, and transmitted. When transmitting CIELAB image data, information indicating the fact that the image data is color image data, and information indicating the fact that the image data is CIELAB image data are set in the DCS signal, and transmitted.

Figure 3:
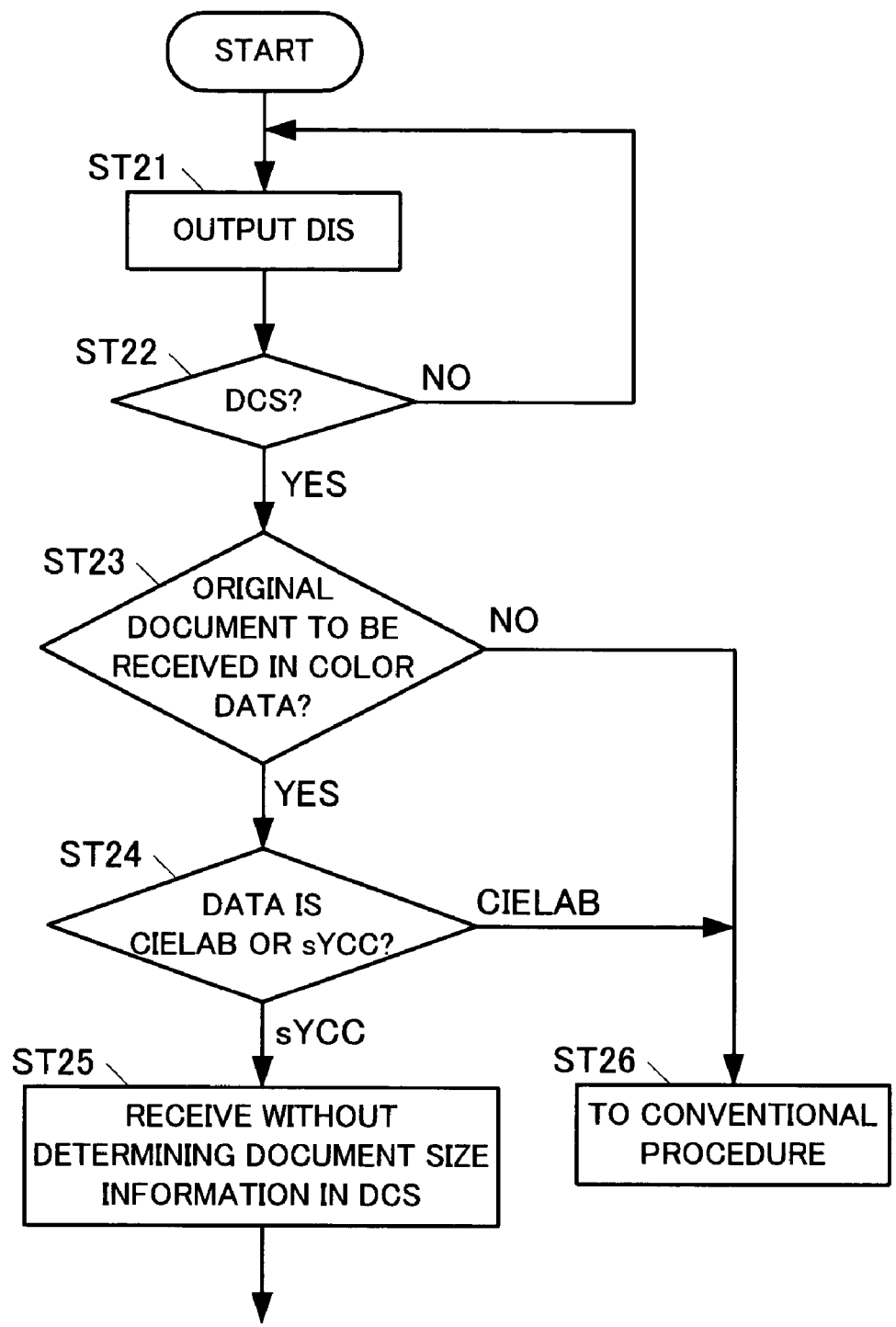
FIG. 3 is a flowchart showing a reception operation of when carrying out a facsimile reception of color image data.

Next, an operation of when carrying out a facsimile reception of color image data by the color image communication device will be described with reference to the flowchart shown in FIG. 3. The flowchart shown in FIG. 3 describes a procedure after the reception of a CNG signal from the calling destination. First, when receiving a CNG signal from the calling destination, in step ST21, a DIS signal of the facsimile transmission control protocol is output to the calling destination. Next, in step ST22, it is determined whether or not the signal received from the calling destination is a DCS signal in the facsimile transmission control protocol. When the received signal is not a DCS signal, the process returns to step ST21, and the DIS signal is transmitted again.

When it is determined in step ST22 that the received signal is a DCS signal, in step ST23, it is determined whether or not an original document (image) to be received is color image data. As described above, the received DCS signal includes information indicating whether the received image data is color image data or monochrome image data, and information indicating a format (sYCC-JPEG or CIELAB) of image data in case the received image data is color. Therefore, in step ST23, it is determined whether the received image data is color image data or monochrome image data in accordance with the DCS signal received in step ST22. When it is determined in step ST23 that the received image data is color image data, in step ST24, it is determined whether the color image data is CIELAB-JPEG image data or sYCC-JPEG image data in accordance with the DCS signal received in step ST22. In case of sYCC-JPEG image data, in step ST25, the sYCC-JPEG image data is received without determining the document size in accordance with the DCS signal. The sYCC-JPEG image data received in step ST25 is stored in the image memory 6 under a compressed state.

Meanwhile, when it is determined in step ST23 that the original document is not color image data, in other words, when it is determined that the original document is monochrome image data, the process proceeds to step ST26. Moreover, when it is determined in step ST24 that the color image data is not sYCC-JPEG image data, in other words, when it is determined that the color image data is CIELAB-JPEG image data, the process proceeds to step ST26. In step ST26, a facsimile reception is carried out as usual under a format according to the ITU-T Recommendation T.81 or the like. In the facsimile reception processing of step ST26, the DCS signal is analyzed to detect a document size, and in accordance with the document size, a processing operation (storing, decoding, forwarding, etc.) is executed on the received image data.

What is claimed is:

1. A color image communication device comprising:
    means for transmitting by facsimile, image data of a sYCC-Joint Photographic Experts Group (JPEG) color space; and
    means for controlling a non-electronic mail facsimile transmission of the image data of the sYCC-JPEG color space without setting size information in a non-electronic mail facsimile communication protocol when the image data to be transmitted by facsimile is the image data of the sYCC-JPEG color space.

2. The color image communication device according to claim 1, wherein when the image data to be transmitted by facsimile is image data of the sYCC-JPEG color space, the means for controlling controls a facsimile transmission of the sYCC-JPEG color space without setting size information in a Digital Command Signal (DCS) of the facsimile communication protocol.

3. The color image communication device according to claim 1, wherein when the image data to be transmitted by facsimile is image data of the sYCC-JPEG color space, the means for controlling controls a facsimile transmission of a file of the image data of the sYCC-JPEG color space under a format in which function information is attached in the file, without setting size information in the facsimile communication protocol.

4. The color image communication device according to claim 3, wherein the function information includes information indicating a fact that the image data included in the file to be transmitted is an image from a digital camera.

5. The color image communication device according to claim 3, wherein the function information includes information indicating a number of pixels of the image data.

6. A color image communication device comprising:
    means for transmitting color image data of a first color space in accordance with a non-electronic mail facsimile communication protocol;
    means for transmitting color image data of a second color space in accordance with the non-electronic mail facsimile communication protocol; and
    means for controlling a facsimile transmission of color image data by setting size information in the non-electronic mail facsimile communication protocol when the color image data is the color image data of the first color space, and to carry out a non-electronic mail facsimile transmission of the color image data without setting the size information in the non-electronic mail facsimile communication protocol when the color image data is the color image data of the second color space.

7. The color image communication device according to claim 6, wherein in case of the color image data of the first color space, the means for controlling controls a facsimile transmission of the color image data by setting the size information in a Digital Command Signal (DCS) of the facsimile communication protocol, and in case of the color image data of the second color space, the means for controlling controls a facsimile transmission of the color image data without setting the size information in a DCS signal of a facsimile communication protocol.

8. The color image communication device according to claim 6, wherein in case of the color image data of the second color space, the means for controlling controls a facsimile transmission of a file of the color image data under a format in which function information is attached in the file, without setting the size information in the facsimile communication protocol.

9. The color image communication device according to claim 8, wherein the function information includes information indicating a fact that the image data included in the file to be transmitted is an image from a digital camera.

10. The color image communication device according to claim 8, wherein the function information includes information indicating a number of pixels of the image data.

11. The color image communication device according to claim 6, wherein image data of a sYCC-Joint Photographic Experts Group (JPEG) color space is included as the color image data of the second color space.

12. The color image communication device according to claim 6, wherein image data of a CIELAB color space is included as the color image data of the first color space.

13. A color image communication method comprising:
    determining whether or not color image data to be transmitted is image data of a sYCC-Joint Photographic Experts Group (JPEG) color space, prior to a facsimile transmission of the color image data; and
    transmitting image data of the sYCC-JPEG color space by non-electronic mail facsimile without setting size information in a non-electronic mail facsimile communication protocol when the color image data to be transmitted is image data of the sYCC-JPEG color space.

14. The color image communication method according to claim 13, wherein when the color image data to be transmitted is image data of the sYCC-JPEG color space, the image data of the sYCC-JPEG color space is transmitted by facsimile without setting the size information in a Digital Command Signal (DCS) of the facsimile communication protocol.

15. The color image communication method according to claim 13, wherein when the color image data to be transmitted is image data of the sYCC-JPEG color space, a file of the image data of the sYCC-JPEG color space is transmitted by facsimile under a format in which function information is attached in the file, without setting the size information in the facsimile communication protocol.

16. The color image communication method according to claim 15, wherein the function information includes information indicating a fact that the image data included in the file to be transmitted is an image from a digital camera.

17. The color image communication method according to claim 15, wherein the function information includes information indicating a number of pixels of the image data.

18. A color image communication method comprising:
    determining whether or not color image data to be transmitted is image data of a sYCC-Joint Photographic Experts Group (JPEG) color space, prior to a facsimile transmission of the color image data; and
    transmitting image data of the sYCC-JPEG color space by non-electronic mail facsimile without setting size information in a non-electronic mail facsimile communication protocol when the color image data to be transmitted is the image data of the sYCC-JPEG color space, and transmitting image data of a color space other than the sYCC-JPEG color space by non-electronic mail facsimile by setting size information in the non-electronic mail facsimile communication protocol when the color image data to be transmitted is not the sYCC-JPEG color space.

19. A color image communication device comprising:

a transmission unit which carries out a facsimile transmission of image data of a sYCC-Joint Photographic Experts Group (JPEG) color space; and a control unit which controls a non-electronic mail facsimile transmission of the image data of the sYCC-JPEG color space without setting size information in a non-electronic mail facsimile communication protocol when the image data to be transmitted by non-electronic mail facsimile is the image data of the sYCC-JPEG color space.

* * * * *